(12) United States Patent
Tanpoco

(10) Patent No.: US 7,634,437 B1
(45) Date of Patent: Dec. 15, 2009

(54) SYSTEM AND METHOD FOR DISPLAYING TRADING DATA

(75) Inventor: Alvin F. Tanpoco, Chicago, IL (US)

(73) Assignee: Trading Technologies International, Inc., Chicago, IL (US)

( * ) Notice: Subject to any disclaimer, the term of this patent is extended or adjusted under 35 U.S.C. 154(b) by 430 days.

(21) Appl. No.: 11/095,235

(22) Filed: Mar. 31, 2005

(51) Int. Cl.
G06Q 40/00 (2006.01)

(52) U.S. Cl. .......... 705/35; 705/32; 705/36 R; 705/37; 705/38; 705/45; 714/49; 715/863

(58) Field of Classification Search .......... None
See application file for complete search history.

(56) References Cited

U.S. PATENT DOCUMENTS

| | | | |
|---|---|---|---|
| 4,907,256 A | 3/1990 | Higuchi et al. | |
| 5,270,922 A * | 12/1993 | Higgins | 705/37 |
| 6,061,662 A * | 5/2000 | Makivic | 705/36 R |
| 6,195,647 B1 * | 2/2001 | Martyn et al. | 705/36 R |
| 6,272,474 B1 * | 8/2001 | Garcia | 705/36 R |
| 6,278,982 B1 * | 8/2001 | Korhammer et al. | 705/36 R |
| 6,772,132 B1 | 8/2004 | Kemp | |
| 6,829,590 B1 * | 12/2004 | Greener et al. | 705/38 |
| 7,127,424 B2 | 10/2006 | Kemp | |
| 7,243,083 B2 | 7/2007 | Burns et al. | |
| 2001/0039527 A1 * | 11/2001 | Ordish et al. | 705/37 |
| 2002/0174056 A1 * | 11/2002 | Sefein et al. | 705/37 |
| 2003/0009411 A1 * | 1/2003 | Ram et al. | 705/37 |
| 2003/0069834 A1 * | 4/2003 | Cutler | 705/37 |
| 2004/0006529 A1 * | 1/2004 | Fung | 705/37 |
| 2004/0193527 A1 * | 9/2004 | Kelly et al. | 705/37 |
| 2004/0236662 A1 * | 11/2004 | Korhammer et al. | 705/37 |
| 2005/0044031 A1 * | 2/2005 | Lebedev | 705/37 |
| 2005/0144109 A1 * | 6/2005 | Boni et al. | 705/36 |
| 2006/0265320 A1 * | 11/2006 | Duquette | 705/37 |

* cited by examiner

*Primary Examiner*—James P Trammell
*Assistant Examiner*—Sanjeev Malhotra
(74) *Attorney, Agent, or Firm*—McDonnell Boehnen Hulbert & Berghoff LLP

(57) ABSTRACT

A system and method are provided for presenting trading information. One example method includes displaying a plurality of effective trade indicators corresponding to price levels at which effective trades have been initiated, and displaying trading information corresponding to each effective trade. The effective trades can be determined based on user-configured trade definitions. The trading information can include a traded quantity and profit/loss corresponding to each effective trade. In addition to the trading information, current market information could be displayed as well in relation to the plurality of effective trades.

6 Claims, 7 Drawing Sheets

FIFO (Flat to Long)

| Order | B/S | Qty | Price | Net Position |
|---|---|---|---|---|
| 1 | Buy | 4 | 1124.0 | +4 |
| 2 | Buy | 6 | 1124.0 | +10 |

FIFO (Flat To Long To Flat)

| Order | B/S | Qty | Price | Net Position | Net P/L | Formula |
|---|---|---|---|---|---|---|
| 1 | Buy | 5 | 1124.00 | +5 | 0 | Trade Level |
| 2 | Sell | 1 | 1124.50 | +4 | 25 | (Order 2 – Order 1) * Qty * Tick Value |
| 3 | Sell | 1 | 1123.75 | +3 | -12.5 | (Order 3 – Order 1) * Qty * Tick Value |
| 4 | Sell | 1 | 1124.50 | +2 | 25 | (Order 4 – Order 1) * Qty * Tick Value |
| 5 | Buy | 1 | 1124.50 | +3 | 0 | Trade Level |
| 6 | Sell | 2 | 1125.00 | +1 | 100 | (Order 6 – Order 1) * Qty * Tick Value |
| 7 | Sell | 1 | 1125.50 | 0 | 50 | (Order 7 – Order 5) * Qty * Tick Value |

FIFO (Flat To Long to Short To Flat)

| Order | B/S | Qty | Price | Net Position | Net P/L | Formula |
|---|---|---|---|---|---|---|
| 1 | Buy | 5 | 1124.00 | +5 | 0 | Trade Level |
| 2 | Sell | 2 | 1124.50 | +3 | 50 | (Order 2 – Order 1) * Qty * Tick Value |
| 3 | Sell | 1 | 1124.75 | +2 | 37.5 | (Order 3 – Order 1) * Qty * Tick Value |
| 4 | Sell | 7 | 1125.00 | -5 | 100 | (Order 4 – Order 1) * Qty * Tick Value |
| 5 | Buy | 1 | 1125.00 | -4 | 0 | (Order 4 – Order 1) * Qty * Tick Value/Trade Level |
| 6 | Buy | 1 | 1124.00 | -3 | 50 | (Order 4 – Order 5) * Qty * Tick Value |
| 7 | Buy | 1 | 1123.00 | -2 | 100 | (Order 4 – Order 6) * Qty * Tick Value |
| 8 | Buy | 1 | 1122.00 | -1 | 150 | (Order 4 – Order 7) * Qty * Tick Value |
| 9 | Buy | 1 | 1121.00 | 0 | 200 | (Order 4 – Order 8) * Qty * Tick Value |
|   |     |   |         |   |     | (Order 4 – Order 9) * Qty * Tick Value |

FIG. 3C

LIFO (Flat to Short)

| Order | B/S | Qty | Price | Net Position |
|---|---|---|---|---|
| 1 | Sell | 1 | 1125.0 | -1 |
| 2 | Sell | 1 | 1127.0 | -2 |

FIG. 3D

LIFO (Flat To Short To Flat) — 308

| Order | B/S | Qty | Price | Net Position | Net P/L | Formula |
|---|---|---|---|---|---|---|
| 1 | Sell | 1 | 1125.00 | -1 | 0 | Trade Level |
| 2 | Sell | 1 | 1126.00 | -2 | 0 | Trade Level |
| 3 | Buy | 1 | 1125.50 | -1 | 25 | (Order 2 – Order 3) * Qty * Tick Value |
| 4 | Sell | 5 | 1126.00 | -6 | | Trade Level |
| 5 | Buy | 3 | 1125.50 | -3 | 75 | (Order 4 – Order 5) * Qty * Tick Value |
| 6 | Sell | 1 | 1127.00 | -4 | | Trade Level |
| 7 | Buy | 1 | 1126.00 | -3 | 50 | (Order 6 – Order 7) * Qty * Tick Value |
| 8 | Buy | 1 | 1125.00 | -2 | 50 | (Order 4 – Order 8) * Qty * Tick Value |
| 9 | Buy | 1 | 1124.00 | -1 | 100 | (Order 4 – Order 9) * Qty * Tick Value |
| 10 | Buy | 1 | 1123.00 | 0 | 100 | (Order 1 – Order 10) * Qty * Tick Value |

FIG. 3E

LIFO (Flat To Short To Long to Flat) — 310

| Order | B/S | Qty | Price | Net Position | Net P/L | Formula |
|---|---|---|---|---|---|---|
| 1 | Sell | 1 | 1125.00 | -1 | 0 | Trade Level |
| 2 | Sell | 1 | 1126.00 | -2 | 0 | Trade Level |
| 3 | Buy | 1 | 1125.50 | -1 | 25 | (Order 2 – Order 3) * Qty * Tick Value |
| 4 | Sell | 5 | 1126.00 | -6 | | Trade Level |
| 5 | Buy | 3 | 1125.50 | -3 | 75 | (Order 4 – Order 5) * Qty * Tick Value |
| 6 | Sell | 1 | 1127.00 | -4 | | Trade Level |
| 7 | Buy | 1 | 1126.00 | -3 | 50 | (Order 6 – Order 7) * Qty * Tick Value |
| 8 | Buy | 3 | 1125.00 | 0 | 150 | (O4–O8)*Qty*TickValue & (O1-O8)*Qty*TickValue |
| 9 | Buy | 3 | 1125.00 | +3 | 0 | Trade Level |
| 10 | Buy | 1 | 1126.00 | +4 | 0 | Trade Level |
| 11 | Sell | 1 | 1126.50 | -3 | 25 | (Order 11 – Order 10) * Qty * Tick Value |
| 12 | Sell | 3 | 1127.00 | 0 | 300 | (Order 12 – Order 9) * Qty * Tick Value |

FIG. 3F

Please Enter Drawings Amendments. /SM/

| YM 04 | # | SHORT | LONG | P/L |
|---|---|---|---|---|
| 10422 | 6 | | | $-550 |
| 10410 | 1 | 850 | 50 | $-300 |
| 10400 | 1 | | | $5,000 |
| 10400 | 1 | 5 | 310 | $2,200 |
| 10384 | 1 | | 1 | $800 |
| 10382 | 1 | | 1 | $1,200 |
| 10380 | 1 | 2 | | $7,500 |
| 10375 | 2 | 50 | | $3,750 |
| 10370 | 8 | | 700 | $2,500 |

FIG. 4

| YM 04 | # | SHORT | LONG | P/L | Volume Traded |
|---|---|---|---|---|---|
| 10422 | 6 | | 50 | $50 | 25,654 |
| 10410 | 1 | 850 | | $-300 | 20,543 |
| 10400 | 1 | | 310 | $5,000 | 35,034 |
| 10400 | 1 | 5 | | $2,200 | 10,123 |
| 10384 | 1 | | 1 | $800 | 9,011 |
| 10382 | 1 | | 1 | $1,200 | 11,065 |
| 10380 | 1 | 2 | | $7,500 | 8,001 |
| 10375 | 2 | 50 | | $3,750 | 15,043 |
| 10370 | 8 | | 700 | $2,500 | 23,546 |

FIG. 5

SYSTEM AND METHOD FOR DISPLAYING TRADING DATA

TECHNICAL FIELD

The present invention is directed to electronic trading. More specifically, the present invention is directed towards processing and displaying trading information.

BACKGROUND

An exchange is a central marketplace with established rules and regulations where buyers and sellers, referred to as traders, meet to trade. Some exchanges, referred to as open outcry exchanges, operate using a trading floor where buyers and sellers physically meet on the floor to trade. Other exchanges, referred to as electronic exchanges, operate by an electronic or telecommunications network instead of a trading floor to facilitate trading in an efficient, versatile, and functional manner. An electronic exchange typically provides a matching process between buying and selling traders. Electronic exchanges have made it possible for an increasing number of people to actively participate in a market at any given time. The increase in the number of potential market participants has led to, among other things, a more competitive market and greater liquidity. Some example exchanges are Eurex, LIFFE, CME, and CBOT.

With respect to electronic exchanges, traders may connect to an electronic exchange trading platform by way of a communication link through their user terminals. Once connected, traders may typically choose which tradeable objects they wish to trade. As used herein, the term "tradeable object" refers to anything that can be traded with a quantity and/or price. It includes, but is not limited to, all types of traded events, goods and/or financial products, which can include, for example, stocks, options, bonds, futures, currency, and warrants, as well as funds, derivatives and collections of the foregoing, and all types of commodities, such as grains, energy, and metals. The tradeable object may be "real," such as products that are listed by an exchange for trading, or "synthetic," such as a combination of real products that is created by the user. A tradeable object could actually be a combination of other tradeable objects, such as a class of tradeable objects.

Client entities, such as computers being used by traders to trade, are typically connected to an electronic exchange by way of a communication link to facilitate electronic messaging between the trading entities and the exchange. The messaging may include market information that is distributed from the electronic exchange to traders, as well as orders, quotes, acknowledgements, fills, cancels, deletes, cancel and replace, and other well-known financial transaction messages. Although the amount or type of market information published by an electronic exchange often differs, there are typically some standard pieces of information. For instance, market information usually includes the inside market, which generally includes the current lowest sell price (often referred to as the best ask) and the current highest buy price (often referred to as the best bid). Market information may also include market depth, which generally refers to quantities available in the market at the price levels other than those corresponding to the inside market. In addition to providing order book information including price and quantity information, electronic exchanges can offer other types of market data such as the open price, settlement price, net change, volume, last traded price, last traded quantity, and order fill-information.

Once a trader at the client entity receives the market information, it may be displayed on the trading screen. Upon viewing the market information, traders can take certain actions including the actions of sending buy or sell orders to the electronic market, adjusting existing orders, deleting orders, or otherwise managing orders. Traders may also use software tools to automate these and additional actions.

To profit in electronic markets, market participants must be able to assimilate large amounts of data, and must react to the received data more quickly than other competing market participants. Thus, it is desirable to offer tools that can assist a trader in trading in such electronic trading systems.

SUMMARY

Certain embodiments of the present invention provide a method for presenting trading information including receiving a definition for an effective trade, storing the definition for the effective trade, sending a plurality of orders to an electronic exchange to buy or sell a tradeable object, determining that a first order (comprising a designated price) of the plurality of orders sent to the electronic exchange initiates the effective trade according to the definition, receiving data relating to the plurality of orders placed for the tradeable object at the electronic exchange, using the definition to determine whether the effective trade has occurred based on the received data, computing the profit/loss value for the effective trade based on the received data, and displaying, on a graphical user interface, the profit/loss value at a location that corresponds to the designated price at which the effective trade was initiated. The effective trade comprises a grouping of filled orders. The grouping of filled orders includes filled orders related by the definition and is to be used to determine a profit/loss value for the effective trade. At least one of the plurality of orders is an order to buy the tradeable object and at least one of the plurality of orders is an order to sell the tradeable object.

Certain embodiments of the present invention provide a graphical interface for presenting trading information including a first indicator and a second indicator. The first indicator indicating an effective trade detected in relation to a tradeable object. The effective trade is detected using an effective trade definition defined for the tradeable object. The effective trade comprises a grouping of filled orders. The grouping of filled orders includes filled orders related by the definition and is to be used to determine a profit/loss value for the effective trade. The effective trade is detected further based on data received from an electronic exchange, the data being related to orders that were placed for the tradeable object at the electronic exchange. The second indicator indicating the profit/loss value computed for the effective trade. The profit/loss value is computed based on the received data.

Certain embodiments of the present invention provide a computer readable medium having stored therein instructions to execute the method including receiving a definition for an effective trade, storing the definition for the effective trade, sending a plurality of orders to an electronic exchange to buy or sell a tradeable object, determining that a first order (comprising a designated price) of the plurality of orders sent to the electronic exchange initiates the effective trade according to the definition, receiving data relating to the plurality of orders placed for the tradeable object at the electronic exchange, using the definition to determine whether the effective trade has occurred based on the received data, computing the profit/loss value for the effective trade based on the received data, and displaying, on a graphical user interface, the profit/loss value at a location that corresponds to the designated price at which the effective trade was initiated. The effective trade comprises a grouping of filled orders. The grouping of filled orders includes filled orders related by the definition and is to be used to determine a profit/loss value for the effective trade. At least one of the plurality of orders is an order to buy the tradeable object and at least one of the plurality of orders is an order to sell the tradeable object.

BRIEF DESCRIPTION OF THE DRAWINGS

Example embodiments of the present invention are described herein with reference to the following drawings, in which:

FIGS. 3A-3F illustrate a plurality of examples for detecting effective trades and determining trading information in relation to each trade level;

FIG. 4 is a block diagram illustrating an example display that can be used to display trading information in relation to a plurality of trade levels; and FIG. 5 is a block diagram illustrating another example display that can be used to display trading information in relation to a plurality of trading levels and indicators corresponding to the current market conditions.

DETAILED DESCRIPTION

I. Effective Trade Data Display Overview

Figure 1:
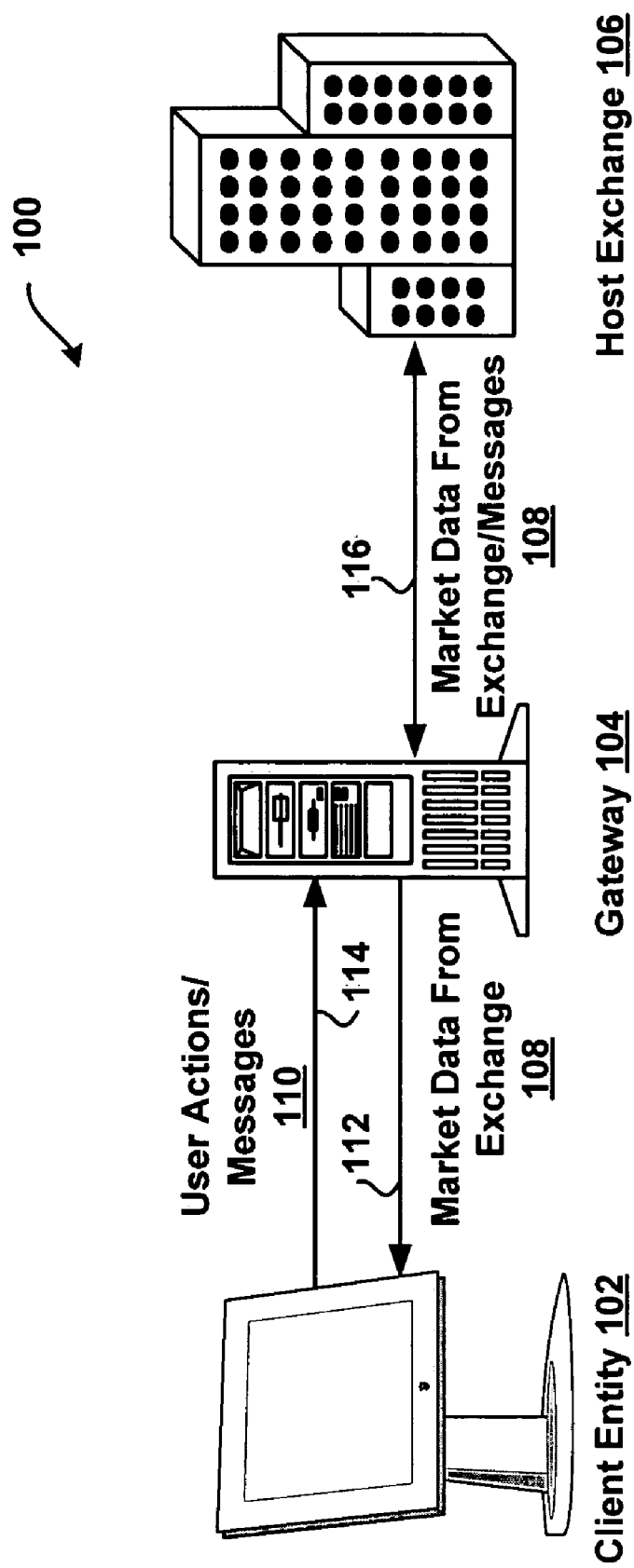
FIG. 1 is a block diagram illustrating an example network configuration for a communication system utilized to access one or more exchanges.

It is beneficial to offer tools that can assist a trader in trading in an electronic trading environment and that can help the trader to view market trends, current market conditions, as well as the trader's performance in a speedy and accurate manner. The example embodiments, among other things, are directed towards displaying volume and other trading data in relation to orders initiated by a trader. One example method includes displaying a plurality of indicators associated with a plurality of effective trades corresponding to a plurality of trades that a trader performed in relation to a tradeable object. The method also includes displaying trading related information corresponding to each effective trade. According to the example embodiment, an effective trade can be detected by grouping a plurality of orders based on any user-defined formula or definition that controls grouping of orders to detect the effective trade. The effective trade may be identified using a price level at which an effective trade was initiated. According to one example, an effective trade could be detected when a trader's net position changes from flat to short and then to flat again, with the effective trade containing all fills that were used to go back to the flat position. Then, trading related information corresponding to the effective trade could include a profit/loss ("P/L") level and a quantity that was traded in relation to the effective trade, such as a quantity corresponding to an order that created the short position. The quantities displayed in relation to each effective trade may be grouped based on whether the order that initiated an effective trade was a buy order, thus, resulting in a long trade, or a sell order, thus, resulting in a short trade. According to one example embodiment, new trade indicators as well as corresponding trading data can be automatically displayed when new trades are detected.

While the example embodiments are described herein with reference to illustrative embodiments for particular applications, it should be understood that the example embodiments are not limited thereto. Other systems, methods, and advantages of the present embodiments will be or become apparent to one with skill in the art upon examination of the following drawings and description. It is intended that all such additional systems, methods, features, and advantages be within the scope of the present invention, and be protected by the accompanying claims.

II. Hardware and Software Overview

As will be appreciated by one of ordinary skill in the art, the example embodiments may be operated in an entirely software embodiment, in an entirely hardware embodiment, or in a combination thereof. However, for sake of illustration, the example embodiments are described in a software-based embodiment, which is executed on a computer device. As such, the example embodiments may take the form of a computer program product that is stored on a computer readable storage medium and is executed by a suitable instruction system in the computer device. Any suitable computer readable medium may be utilized including hard disks, CD-ROMs, optical storage devices, or magnetic storage devices, for example.

In an electronic trading environment, when an authorized trader selects a tradeable object, the trader may access market data related to the selected tradeable object(s). Referring to FIG. 1, an example communication that might occur between an electronic exchange and a client entity in accordance with the example embodiments is shown. During a trading session, market data 108, in the form of messages, may be relayed from a host exchange 106 over communication links 116 and 112 to a client entity generally indicated as 102. The client entity 102 may be a single client terminal that is used by a single trader or multiple client terminals corresponding to multiple traders associated with one or more trading groups. As illustrated in FIG. 1, intermediate devices, such as gateway(s) 104, may be used to facilitate communications between the client entity 102 and the host exchange 106. It should be understood that while FIG. 1 illustrates the client entity 102 communicating with a single host exchange 106, in an alternative embodiment, the client entity 102 could establish trading sessions with more than one host exchange. Also, it should be understood that information being communicated between the client entity 102 and the exchange 106 could be communicated via a single communication path.

The market data 108 contains information that characterizes the tradeable object including, among other parameters, order related parameters, such as price and quantity, and the inside market, which represents the lowest sell price (also referred to as the best or lowest ask price), and the highest buy price (also referred to as the best or highest bid price). In some electronic markets, market data may also include market depth, which generally refers to quantities available for trading the tradeable object at certain buy price levels and quantities available for trading the tradeable object at certain sell price levels.

In addition to providing the tradeable object's order book information, electronic exchanges can offer different types of market information such as total traded quantity for each price level, opening price, last traded price, last traded quantity, closing price, or order fill information. It should be understood that market information provided from an electronic exchange could include more or fewer items depending on the type of tradeable object or the type of exchange. Also, it should be understood that the messages provided in the market data 108 may vary in size depending on the content carried by them, and the software at the receiving end may be programmed to understand the messages and to act out certain operations.

A trader may view the information provided from an exchange via one or more specialized trading screens created by software running on the client entity 102. Upon viewing the market information or a portion thereof, a trader may wish to take actions, such as send orders to an exchange, cancel orders at the exchange, or change order parameters, for example. To do that, the trader may input various commands or signals into the client entity 102. Upon receiving one or more commands or signals from the trader, the client entity 102 may generate messages that reflect the actions taken, generally shown at 110. It should be understood that different types of messages or order types can be submitted to the host exchange 106, all of which may be considered various types of transaction information. Once generated, user action messages 110 may be sent from the client entity 102 to the host exchange over communication links 114 and 116.

The client entity 102 may use software that creates specialized interactive trading screens on the client entity 102. The trading screens enable traders to enter and execute orders, obtain market quotes, and monitor positions. The range and quality of features available to the trader on his or her screens varies according to the specific software application being run. In addition to or in place of the interactive trading screens, the client entity 102 may run automated non-interactive types of trading applications.

A commercially available trading application that allows a user to trade in systems like those shown in FIG. 1 and subsequent figures is X_TRADER® from Trading Technologies International, Inc. of Chicago, Ill. X_TRADER® also provides an electronic trading interface, referred to as MD Trader™, in which working orders and bid/ask quantities are displayed in association with a static price axis or scale. Portions of the X_TRADER® and the MD Trader™-style display are described in U.S. Pat. No. 6,772,132 entitled "Click Based Trading With Intuitive Grid Display of Market Depth," filed on Jun. 9, 2000, U.S. patent application Ser. No. 09/971,087, entitled "Click Based Trading With Intuitive Grid Display of Market Depth and Price Consolidation," filed on Oct. 5, 2001, now U.S. Pat. No. 7,127,424, and U.S. patent application Ser. No. 10/125,894, entitled "Trading Tools for Electronic Trading," filed on Apr. 19, 2002, the contents of each are incorporated herein by reference. As mentioned above, the scope of the example embodiments described herein are not limited by the type of terminal or device used, and are not limited to any particular type of trading application.

III. Example System Function and Operation

The system and methods described hereinafter can be used to assist a trader in monitoring his trade history, including his trading performance, in a speedy and accurate manner. More specifically, and as will be described in greater detail below, a graphical interface is provided that allows a trader to view trade related information in relation to a plurality of indicators associated with a plurality of trades, such as price levels at which a trader initiated his trades. The graphical interface may also display one or more indicators associated with market related information so that a trader can easily view current market conditions in relation to his trading data. According to the example embodiments that will be described in greater detail below, the trades, also referred hereinafter as effective trades, may be detected based on any user-configured formulas defining what constitutes an effective trade.

Figure 2:
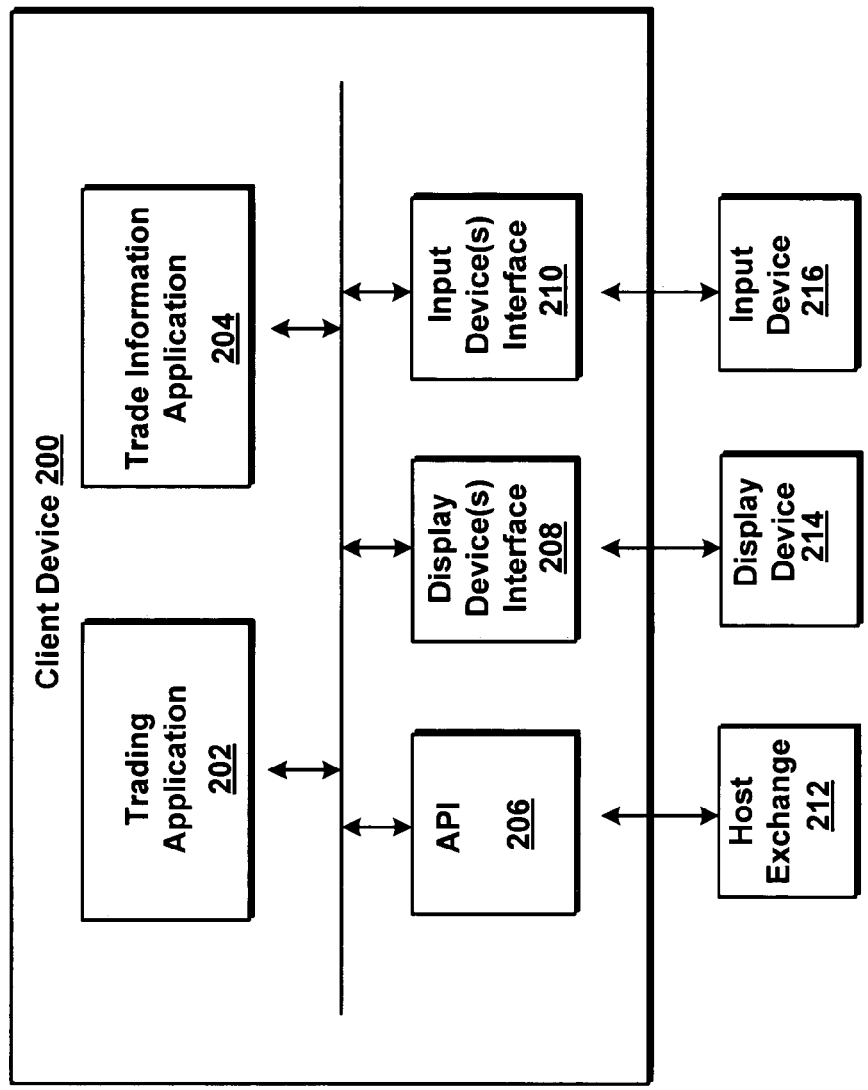
FIG. 2 is a block diagram illustrating an example embodiment of a client device.

FIG. 2 is an example client device 200 including a plurality of components that can be used to process market data being provided by an electronic exchange according to the example embodiments. The example client device 200 can include any type of computing device, such as a personal computer, laptop computer, hand-held computer, or other devices that have network access. According to the example embodiments, the client device 200 has a trading application 202 stored in a memory unit. When executed, the trading application 202 arranges and displays market information in many different ways, usually depending on how the trader prefers to view the information.

The trading application 202 has access to market information, and can forward transaction information to the exchange 212 through an application programming interface ("API") 206. Alternatively, API 206 could be distributed so that a portion of the API 206 rests on the client device 200 and a gateway, or at the exchange 212. Additionally, the trading application 202 could receive other information through the API 206, such as news or numbers from outside sources other than the exchange 212.

Client device 200 also includes a trade information application 204 that can implement the embodiments for presenting trading information described herein. The trade information application 204 can generate a graphical interface that a trader can use to view his trading data arranged in relation to a plurality of effective trades detected based on effective trade definitions. According to the example embodiments, the trade information application 204 uses one or more effective trade definitions to determine when an effective trade is initiated, and also how consequently filled orders should be grouped to determine any trading information corresponding to the effective trade, the embodiments of which will be described in greater detail below. The trading information that can be displayed for each effective trade may include a profit/loss ("P/L") level determined for a trade level, a total quantity traded in relation to the effective trade, as well as other information.

The effective trade definitions could be user configurable and could take many different formats. For example, an effective trade could be detected when a trader, after having a flat position, takes a position in the market, such as buys or sell quantity in relation to a tradeable object. Alternatively, an effective trade could be defined when a trader's net position changes from being short to long, or from long to short. According to the example embodiments described herein, an effective trade contains all fills received while the trader has an open position created with an order and until the position created in relation to that order is closed. In other words, an effective trade may be defined as going from a flat position to having a position—either short or long, to being flat again.

According to the example embodiments, a trader could define additional rules that may allow the trade information application 204 to determine how to pair the executed, e.g., filled, buy and sell orders, to detect trade levels and to determine trading information for each effective trade. Two example methods of pairing the buy and sell orders are first in, first out ("FIFO"), and last in, last out ("LIFO"). To illustrate the two methods, let's assume that a trader executes three orders, and the orders get filled at an electronic exchange: Buy #1 with an order quantity of 5, Buy #2 with an order quantity of 5, and Sell #1 with an order quantity of 3. Using the FIFO method, the trade information application 204 may determine any trading related information, such as profit/loss ("P/L") values, by grouping the Sell #1 order with the Buy #1 order first, before the second Buy #2 order is considered. If LIFO method is used, any trade information would be determined by grouping the Sell #1 order with the Buy #2 order before the first Buy #1 order is considered.

FIGS. 3A-3F illustrate a plurality of examples for detecting effective trades and determining trading information in relation to each trade level. For all examples in FIGS. 3A-3F, let's assume that the tick value of a single tick price increase or decrease is +/−$50. Each FIGS. 3A-3F illustrates a table having a number of columns, including an order column, an order type ("B/S") column, a quantity ("Qty") column, a "Price" column, a "Net Position" column, and a "Net P/L" column. The order column lists an example set of orders that a trader placed at an electronic exchange and that were filled for a tradeable object. The order type column indicates if an order was a buy or a sell, and the "Qty" column includes a quantity that was traded in relation to each order. The "Price" column defines a price level at which each order was placed. The "Net Position" column indicates a cumulative net position value. The "Net P/L" column lists P/L levels calculated based on the shown orders, and a "Formula" column illustrates which orders correspond to effective trades and how other orders are grouped to calculate trading information in relation to each detected effective trade.

FIG. 3A illustrates an embodiment of detecting effective trades when a trader's position changes from flat to long, and the FIFO method is used to control grouping of the orders. Since two buy orders are placed at the same price level, and assuming that the trader's net position before executing the buy orders was zero, a net effective trade can be detected based on the two buy orders. The effective trade, as mentioned in relation to earlier paragraphs, could be identified using the price level corresponding to the executed buy orders, which in this example is 1124.00. Alternatively, rather than detecting a single trade, two trades could be detected as well in relation to the trade level 1124.00, one trade based on the first order and the second trade based on the second order.

FIG. 3B illustrates an embodiment for detecting effective trades when a trader's position changes from flat to long and then to flat again, while the FIFO method is used to determine which orders are used to offset the opened positions. As mentioned in relation to earlier figures, in addition to displaying indicators corresponding to effective trades, the trade information application 204 may determine trading information, such as P/L or some other item of interest, in relation to each effective trade. The Formula column in Table 302 shows how the orders were grouped to establish P/L for each detected trade. As shown in FIG. 3B, two trades are detected in relation to the first order and the fifth order. The first order corresponds to a trade since a trader's net position is changed from 0 to +5 by executing the first buy order. Then, the fifth order corresponds to another trade since the trader's net position is further increased before the open position created with the first order is closed. The Formula column then shows how subsequently executed sell orders are paired with the orders that initiated the effective trades. For example, as shown in relation to the second order, the sell order at 1124.50 is paired with the first order corresponding to the detected trade. The Net P/L of 25 corresponding to the second order is determined using the formula (Order 2−Order 1)*Qty*Tick Value, which in this example corresponds to (1124.50−1124.00)*1*50, or 25, as shown in the Net P/L column in relation to the second order. As shown in FIG. 3B, the net position created with the first order is closed using the second, third, fourth, and sixth orders. Since the FIFO method controls how the orders are grouped, the sixth order is used to close the position created with the first order rather than the fifth order that was placed in the market later than the first order. Based on the Net P/L listed in Table 302, the Net P/L corresponding to the first effective trade and the second effective trade level are 137.50 and 50, respectively.

FIG. 3C illustrates an embodiment for detecting trades when a trader's position changes from flat to long to short to flat, and the FIFO method is used to determine which orders are used to offset the opened positions. As shown in Table 304, two trades are detected, with the first trade being initiated with the first order, and the second trade being initiated with the fourth order. The P/L for the first trade is established based on the second, third, and partially the fourth order, with the quantity of 2 corresponding to the fourth order being used to close position initiated with the first order, and the remaining quantity of 5 creating the second trade that is offset with orders 5-9. Similarly to the previous figure, Table 304 shows Net P/L established in relation to each order that is used to offset the open positions created at the trades.

As mentioned earlier, rather than using the FIFO method for grouping orders in relation to effective trades, the LIFO method could be used instead. FIGS. 3D-3F illustrate three example embodiments for detecting trades, while using the LIFO method to group orders. Referring to FIG. 3D, Table 306 shows two sell orders that constitute two trades at price levels of 1125.0 and 1127.0, respectively. No Net P/L values are shown in relation to either of the orders since none of the shown orders can offset the opened positions.

FIG. 3E illustrates another embodiment for detecting trades when a trader's position changes from Flat to Short and then to Flat again, while the LIFO method is used to determine which orders are used to offset the opened positions corresponding to the trades. As shown in Table 308, there are four effective trades. The Formula column shows how the orders are grouped based on the LIFO method. For example, the third order, corresponding to the Buy order having a quantity of 1, is used to offset the open position created in relation to the second order rather than the first order since the second sell order was placed after the first order, or in other words was the "Last In." Similarly, for example, the buy quantity corresponding to the fifth order is used to offset the position created with the fourth order corresponding to the sell.

FIG. 3F illustrates yet another embodiment for detecting trades when a trader's net position changes from Flat to Short to Long to Flat, while also using the LIFO method. As shown in Table 310, six trades are detected in relation to the first, second fourth, sixth, ninth, and tenth orders. The LIFO method is used to determine which orders should be used to determine P/L levels for each effective trade. For example, as shown in the Formula column of Table 310, the eighth order is used to determine the P/L in relation to the first trade at 1125.00, and the third order is used to determine the P/L in relation to the second trade at 1126.00.

IV. Example Trading Information Displays

FIG. 4 is a block diagram illustrating one example trading information display 400 that can be used for displaying trading information in relation to a plurality of trades associated with a tradeable object. The display 400 includes a trade level column 402, a trade number column 404, a short quantity column 406, a long quantity column 408, and an accumulated profit/loss ("P/L") column 410 corresponding to the trade levels. The trade level column 402 specifies price levels at which long and short trades have been initiated. It should be understood that indicators, other than prices, could also be used to indicate trade levels.

The trade number column 404 specifies the number of trades that were deemed initiated at each trade level, so that when more than one effective trade was detected in relation to a specific price level, that number will be displayed in the trade number column. The short quantity column 406 and the long quantity column 408 indicate if an effective trade was initiated with a buy order (long trade) or a sell order (short trade). In such an embodiment, two trade levels, such as trade levels corresponding to the price level of 10400, could be displayed in relation to the interface when a short trade and a long trade have been initiated from the same trade level. Also, while FIG. 4 shows two separate columns in relation to short trades and long trades, in an alternative embodiment, the two columns could be combined into a single column reflecting a total quantity traded at each trade level. The trade levels can be determined using methods described above in relation to FIGS. 3A-3F. However, different methods could also be used for detecting trade levels.

Finally, the P/L column 410 represents the cumulative profit and loss incurred in relation to each trade level. For example, referring to FIG. 3B, there were two trade levels detected in relation to the price level 1124.00 and 1124.5, with two trade levels corresponding to two long trades, and the cumulative P/Ls for each level being 137.50 and 50, respectively. Referring to FIG. 4, for example, the trade level corresponding to the price of 10422 corresponds to 6 trades, all of which were initiated as long trades, with a total traded quantity of 50. Then, the P/L level corresponding to the 10422 trade level is $550. Similar data is shown in relation to other trade levels illustrated in FIG. 4. While not shown in FIG. 4, the interface 400 could also include the total P/L level value corresponding to all trades at the plurality of trade levels. Also, a plurality of P/L levels could be shown in relation to each trade level, and the plurality of P/L values could correspond to a plurality of trades initiated at that trade level. In such an embodiment, for example, the trade level of 10422 could include the overall P/L level, and then six individual P/L levels corresponding to the six trades that were initiated at that trade level. It should be understood that the entries in the display 400 are dynamically updated as the trade information application 204 detects new trades in relation to the existing or new trade levels. When the trade information application 204 detects a new trade level, the trade information application 204 could automatically create a new row in the display 400 for the detected trade level, and the trading information corresponding to the new trade level could be populated in the newly created cells.

It should be understood that the trade information display 400 is not limited to the format in FIG. 4, and it could take many different formats and shapes. For example, rather than displaying trading information corresponding to each trade level horizontally in relation to each trade level, in another embodiment, the same information could be displayed in vertical columns, or yet in some other configuration.

FIG. 5 is a block diagram illustrating another example trade information display 500 that can be used to display trade level related data as well as market data related to a tradeable object. Similarly to the display 400 illustrated in FIG. 4, the trade information display 500 includes a trade level column 502, a trade number column 504, a short quantity column 506, a long quantity column 508, and a P/L column 510. The data displayed in relation to each of the columns 502-508 have been described in relation to the preceding FIG. 4. Additionally, FIG. 5 includes a total volume traded column 512 that displays a total volume that was traded in relation to each trade level. Using such a display, a trader can quickly assess the market activity at each of his trade levels. Similarly to other values displayed in relation to the trade information display 500, the total traded volume values could be dynamically updated based on market data being received from an electronic exchange.

Also, the trade information display 500 includes a graphical indicator in relation to each value displayed in the short and long quantity columns 506 and 508. The graphical indicator, as shown in FIG. 5, could include a bar, such as the bar 514 illustrated in relation to the trade level of 10422. The length of the bar could be controlled based on any user-defined scale. For example, the entire length of each cell in the long and short quantity columns could be preconfigured to correspond to a predetermined value, and then the length of each bar displayed in the cells could be scaled accordingly.

The trade information displays could also reflect current market conditions. The example trade information display 500 includes a graphical indicator 516 that dynamically corresponds to the last traded price, 10400 in this example, i.e., moves up and down the chart. While the indicator 516 is of the format that highlights the entire length of the level corresponding to the trade level, it should be understood that different indicators could be used as well. Also, another indicator, such as an indicator 518, could be used to show whether the current last traded price is higher or lower than the previous last traded price. The upper arrow in FIG. 5 indicates that the last traded price is higher than the previous last traded price. Similarly, a down arrow could be used to show that the last traded price is lower than the previous last traded price. Rather than showing a separate indicator, the indicator corresponding to the last traded price could be color-coded to indicate the two situations. It should be understood that different parameters could also be displayed in relation to the last traded price. For example, a value indicating a time period from the last change in the last traded price could be displayed so that a trader can easily assess the market's volatility.

Also, as the last traded price moves between the plurality of trade levels, the trade information display 500 could provide additional information, such as the overall P/L level corresponding to a specific range of trade levels, giving a trader an immediate feedback as to how the trader performed in that specific range. One example range 520 is shown in FIG. 5, and the range 520 includes two trade levels. However, it should be understood that a trader could define a different number of trade levels to be used in relation to displaying a range associated with the last traded price.

Rather than, or in addition to displaying the last traded price level, the trade information displays could include different market related data. For example, one or two indicators could be used to display current inside market levels, such as the best bid level, the best ask level, or both inside market levels, in relation to the displayed trade levels. It should be understood that different graphical indicators could be used as well. Also, when the inside market falls at some prices other than those corresponding to the displayed trade levels, a color-coded line, or yet some other indicator, could be displayed in relation to one or more trade levels to indicate whether the inside market is higher or lower than one or more of the displayed trade levels. For example, referring to FIG. 5, if the inside market falls between the trade levels of 10400 and 10384, an indicator, such as a color-coded line, could be displayed on the boundary between the two cells corresponding to the trade levels. It should be understood that the trade information application 204 could dynamically update position(s) of the inside market indicator(s) when it detects a change in the inside market levels.

The trade information displays 400 and 500 illustrated in relation to FIGS. 4 and 5 display trading data related to a single tradeable object being traded by a trader. In another example embodiment, the trade information displays could be configured for use by a system administrator. In such an embodiment, the system administrator could view multiple trade related data displays. Displays corresponding to one trader could be grouped together so that the system administrator could easily assess how each trader is doing. Alternatively, trade information corresponding to a single tradeable object being traded by multiple traders could be displayed in relation to a single trade information display. In such an embodiment, the system administrator could quickly assess the overall standing of all traders who trade the same tradeable object. Yet different configurations are possible as well.

The above description of the example embodiments, alternative embodiments, and specific examples, are given by way of illustration and should not be viewed as limiting. Also, many changes and modifications within the scope of the present embodiments may be made without departing from the spirit thereof, and the present invention includes such changes and modifications.

It will be apparent to those of ordinary skill in the art that methods involved in the system and method for providing trading information in relation to a plurality of trade levels may be embodied in a computer program product that includes one or more computer readable media. For example, a computer readable medium can include a readable memory device, such as a hard drive device, a CD-ROM, a DVD-ROM, or a computer diskette, having computer readable program code segments stored thereon. The computer readable medium can also include a communications or transmission medium, such as, a bus or a communication link, either optical, wired or wireless having program code segments carried thereon as digital or analog data signals.

The claims should not be read as limited to the described order or elements unless stated to that effect. Therefore, all embodiments that come within the scope and spirit of the following claims and equivalents thereto are claimed as the invention.

The invention claimed is:

1. A method for presenting trading information, comprising:
   sending from a computing device a plurality of orders to an electronic exchange to buy or sell a tradeable object, wherein at least one of the plurality of orders is an order to buy the tradeable object and at least one of the plurality of orders is an order to sell the tradeable object;
   receiving at the computing device data relating to the plurality of orders indicating that each of the plurality of orders has been filled at the electronic exchange;
   selecting at the computing device a group of filled orders from the plurality of orders as a first effective trade based on a definition, wherein the group of filled orders includes two or more of the plurality of orders, wherein the definition is used to determine a first order from the plurality of orders initiating the first effective trade and which other orders in the plurality of orders should be grouped with the first order, wherein the first effective trade is associated with a designated price, wherein the designated price is the price of the first order;
   computing at the computing device a profit/loss value for the first effective trade based on the group of filled orders and the received data; and
   displaying, on a graphical user interface, the profit/loss value at a location that corresponds to the designated price.

2. The method of claim 1, further comprising:
   displaying, on the graphical user interface, a quantity value that represents a quantity that was bought or sold when the first effective trade was initiated, wherein the quantity value is displayed at a location that corresponds to the designated price.

3. The method of claim 1, further comprising:
   determining whether the first effective trade corresponds to a long trade or a short trade; and
   indicating, on the graphical user interface, whether the first effective trade was associated with the long trade or the short trade in relation to the designated price.

4. The method of claim 1, further comprising:
   displaying a last traded price indicator in relation to a price level, wherein the last traded price indicator is associated with a current last traded price.

5. The method of claim 1, further comprising:
   displaying a market indicator in relation to the designated price, wherein the market indicator is associated with a current inside market price.

6. A computer readable medium having stored therein instructions to execute the method comprising:
   sending from a computing device a plurality of orders to an electronic exchange to buy or sell a tradeable object, wherein at least one of the plurality of orders is an order to buy the tradeable object and at least one of the plurality of orders is an order to sell the tradeable object;
   receiving at the computing device data relating to the plurality of orders indicating that each of the plurality of orders has been filled at the electronic exchange;
   selecting at the computing device a group of filled orders from the plurality of orders as a first effective trade based on a definition, wherein the group of filled orders includes two or more of the plurality of orders, wherein the definition is used to determine a first order from the plurality of orders initiating the first effective trade and which other orders in the plurality of orders should be grouped with the first order, wherein the first effective trade is associated with a designated price, wherein the designated price is the price of the first order;
   computing at the computing device a profit/loss value for the first effective trade based on the group of filled orders and the received data; and
   displaying, on a graphical user interface, the profit/loss value at a location that corresponds to the designated price.

* * * * *

UNITED STATES PATENT AND TRADEMARK OFFICE
CERTIFICATE OF CORRECTION

PATENT NO.      : 7,634,437 B1                                              Page 1 of 1
APPLICATION NO. : 11/095235
DATED           : December 15, 2009
INVENTOR(S)     : Alvin F. Tanpoco It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 619 days.

Signed and Sealed this

Ninth Day of November, 2010

David J. Kappos
*Director of the United States Patent and Trademark Office*